United States Patent
Chan et al.

(10) Patent No.: US 7,441,709 B2
(45) Date of Patent: Oct. 28, 2008

(54) ELECTRONIC CARD ASSEMBLY

(75) Inventors: Benson Chan, Vestal, NY (US); How T. Lin, Vestal, NY (US); Voya R. Markovich, Endwell, NY (US); Ronald V. Smith, Friendsville, PA (US)

(73) Assignee: Endicott Interconnect Technologies, Inc., Endicott, NY (US)

( * ) Notice: Subject to any disclaimer, the term of this patent is extended or adjusted under 35 U.S.C. 154(b) by 653 days.

(21) Appl. No.: 11/086,324

(22) Filed: Mar. 23, 2005

(65) Prior Publication Data
US 2006/0213973 A1 Sep. 28, 2006

(51) Int. Cl.
*G06K 19/06* (2006.01)
(52) U.S. Cl. ................................. 235/492; 235/486
(58) Field of Classification Search ........... 235/492, 235/491, 493, 441, 486, 487, 475, 474
See application file for complete search history.

(56) References Cited

U.S. PATENT DOCUMENTS

| | | | |
|---|---|---|---|
| 4,225,780 A | 9/1980 | Jacoub et al. | |
| 4,843,220 A | 6/1989 | Haun | |
| 5,055,662 A * | 10/1991 | Hasegawa | 235/492 |
| 5,429,006 A | 7/1995 | Tamori | |
| 5,635,723 A | 6/1997 | Fujieda et al. | |
| 6,414,297 B1 | 7/2002 | Sasaki et al. | |
| 6,474,550 B1 | 11/2002 | Caridas | |
| 6,641,050 B2 | 11/2003 | Kelley et al. | |
| 6,715,679 B1 | 4/2004 | Infosino | |
| 6,782,998 B2 | 8/2004 | Koren | |
| 6,817,520 B2 | 11/2004 | Kroll | |
| 6,832,730 B2 | 12/2004 | Conner et al. | |
| 6,840,446 B2 | 1/2005 | Kawan | |
| 2007/0057038 A1 * | 3/2007 | Gannon | 235/380 |

FOREIGN PATENT DOCUMENTS

| | | | |
|---|---|---|---|
| EP | 803831 | * | 10/1997 |
| WO | 9417498 | * | 8/1994 |

* cited by examiner

*Primary Examiner*—Thien M Le
(74) *Attorney, Agent, or Firm*—Hinman, Howard & Kattell; Mark Levy; Lawrence R. Fraley

(57) ABSTRACT

An electronic card assembly is provided which includes a protective housing having a movable card therein. The card, in one example one having a magnetic stripe, has its information erased when being inserted into the housing and re-written back onto its information portion (magnetic stripe) during card withdrawal, provided appropriate human information (e.g., from a fingerprint) is received by the assembly's reader component.

15 Claims, 2 Drawing Sheets

ELECTRONIC CARD ASSEMBLY

TECHNICAL FIELD

The invention relates to electronic cards and particularly to electronic cards adapted for human use, e.g., for purchasing items or performing financial transactions such as in banking institutions. Examples of such cards are often referred to as "credit" cards, "debit" cards, or bankcards.

BACKGROUND OF THE INVENTION

Many people today carry at least one credit or debit card or bankcard in the form of a conventional size plastic card containing a memory component. Known memory components include magnetic stripes, optical stripes, and, most recently, electronic memories, such as microprocessors in the form of, for example, an integrated circuit (IC) semiconductor chip. Magnetic stripes are typically used to provide identifying information when inserted into a conventional reader, while optical stripes are useful for the ability to function in both a reading and writing capacity with significantly more memory than that afforded by magnetic stripes. IC chips, typically more limited in memory capacity than optical stripes, are extremely useful in the ability to actually store and run programs for manipulating transaction data.

As almost anyone who has used cards of the above type and who has lost or misplaced one can attest, such loss may result in an elevated sense of fear and/or anxiety that the finder may use the card in an inappropriate manner, e.g., to obtain fraudulent purchases. Such loss also places a financial burden on the card issuer who assumes responsibility for such misuse, adding to the costs of such cards for others. Further, credit and bankcard misuse places an added burden on law enforcement agencies responsible for determining and prosecuting criminals who partake of such misuse.

The present invention substantially eliminates the possibility of such card misuse by providing the cardholder with a new and unique means of protecting his/her cards when not in use. As defined herein, the invention provides a housing in which the card holder has positioned his/her card in which the card's information is deleted (erased) after usage and then re-written back onto the card when the card is needed. Human identification means is provided to assure that only the card owner is able to activate the card at the appropriate time.

Examples of various cards, identification structures and related technologies are described in the various patents listed below.

In U.S. Pat. No. 4,225,780, entitled "Method And Device For Superposing A Modifiable Magnetic Code On A Fixed Bar Code", issued Sep. 30, 1980, there is described a method of superposing a modifiable magnetic code on a fixed bar code which magnetizes the bars in two different directions by means of a write head. There is provision for synchronizing the application of write signals to the write head with the passage of the bars of the bar code. The system may include a bar code reading head which reads a code moved by a conveyor belt which causes an image of the bar code to be stored in a shift register with each bar and each space of the bar code being represented by several successive 1's or 0's. The write head then includes a read winding which triggers reading of the image, and the image is gated into a code generator that writes when an image bar is present, thereby writing magnetically onto the real bars of the bar code.

In U.S. Pat. No. 4,843,220, entitled "Automatic Data Capture For Multiple Form Point Of Sale Slip Packs', issued Jun. 27, 1989, there is described a data collection system for recording transaction data from a point of sale terminal which employs a magnetic stripe on the back of the bank copy of a sales slip pack. In response to the receipt of a credit authorization number, the point of sale terminal is operative to transfer transaction data from the credit card magnetic stripe to the sales slip pack magnetic stripe for automatic recordation by the credit card issuer or its designee. The arrangement allegedly eliminates the need for manual key operation to record transaction data at the bank.

In U.S. Pat. No. 5,429,006, entitled "Semiconductor Matrix Type Sensor For Very Small Surface Pressure Distribution", issued Jul. 4, 1995, there is described an analog finger print reader which includes a matrix of electronic switches selectively controlled from a matrix of individually associated electrodes. A thin film having a conductive surface is suspended over the electrodes to apply control potentials to the electrodes in response to the pressure applied by a "mountain" in the pattern of a fingerprint (a ridge is viewed as a string of "mountains"). The area of contact between the conductive film and the electrode varies as an analog of the amount of applied pressure. Shift registers scan the electrodes to identify the address of a finger print mountain which is turning on the associated electronic switch. A detector responds to the address by giving an output which is an analog of the area of contact and, therefore, of the amount of applied pressure. The entire unit is built on a semiconductor substrate.

In U.S. Pat. No. 5,635,723, entitled "Fingerprint Image Input Apparatus", issued Jun. 3, 1997, there is described a fingerprint image input apparatus which includes a plane light source for irradiating light having a two-dimensional light distribution and an approximately even luminance, a two-dimensional image sensor capable of allowing the light to pass through, and an optical part for guiding light from the plane light source, having passed the two-dimensional image sensor, to a finger and guiding light reflected at the finger to the photoelectric converting element. The two-dimensional image sensor includes a plurality of pixels arranged in a matrix form. A bias power source for supplying a bias voltage to the individual pixels, a scanning circuit for outputting a scan signal to the pixels and a first detecting circuit for detecting photoelectric data signals from the pixels are connected to those pixels via bias lines, scan lines and data lines. Connected to the bias lines are a signal generator for generating a finger detection signal to detect the contact of a finger with the optical part and a signal detecting circuit for detecting a change in the finger detection signal. A switch controller outputs a control signal in accordance with a finger detection mode and a fingerprint image input mode. According to the control signal, first and second switch circuits control the connection between the signal generator and the second detecting circuit.

In U.S. Pat. No. 6,414,297, entitled "Reading Apparatus For Reading Fingerprint", issued Jul. 2, 2002, there is described a two-dimensional photo-sensor formed on a surface light source. A transparent conductive layer is formed on the two-dimensional photo-sensor. The transparent conductive layer dissipates static electricity and is grounded. If a human finger in contact with the transparent conductive layer on the two-dimensional photo-sensor is charged with static electricity, this static electricity can dissipate via the transparent conductive layer. When the transparent conductive layer is divided into two layers, and the finger simultaneously touches the two transparent conductive layers, a fingerprint reading start signal is obtained. According to this patent, even if the finger is charged with static electricity, the two-dimensional photo-sensor is prevented from malfunction or damage by the static electricity. When a target object in contact between the transparent conductive layers is a copy having a different resistance value, a reading is not taken.

In U.S. Pat. No. 6,474,550, entitled "Credit Card Reader Enclosure With Debris Opening", issued Nov. 5, 2002, there is described an enclosure for a credit card reader. The enclosure has a top cover for protecting and enclosing the card reader and a base disposed below the card reader, enclosing the bottom surface thereof. The base is configured to allow debris to be conveyed below the card reader. An aperture is formed between the top cover and the base and is aligned with the card slot opening of the card reader so that a user can insert a credit card into, and withdraw it from, the reader. The base of the enclosure is disposed at an angle relative to the horizontal for facilitating conveyance of debris to the rear of the enclosure. The base also has an outlet at its rear for allowing debris to fall out of the enclosure, preventing blocking of the card reader by debris. The enclosure can be used for processing bent, bowed, or warped credit or smart cards. A bent, bowed, or warped credit or smart card that would normally miss the supporting card ramp of the reader and drop through the opening, is re-directed into the processing path by a deflection guide.

In U.S. Pat. No. 6,641,050, entitled "Secure Credit Card", issued Nov. 4, 2003, there is described the use of credit cards or portable identification cards containing smart card technology and electronic fuse (e-fuse) technology, combined with a linear feedback shift register (LFSR) pseudo random number generator to provide a secured method to prevent fraud and unauthorized use. Secure personalization via e-fuses, a pseudo-random number generator linear feedback shift register, free running clock oscillator, and power source embedded in the card provide a highly secured method to render a lost or stolen card useless. A unique card ID is permanently encoded within the card which requires a specific activation code to activate the card. A PIN number permits the card owner to activate the card for a predetermined length of time while processing a transaction. The card dynamically generates random code sequences and synchronization keys to secure a transaction.

In U.S. Pat. No. 6,715,679, entitled "Universal Magnetic Stripe Card", issued Apr. 6, 2004, there is described a credit card sized "universal" card that a user may transform at will into a credit card, automatic teller machine (ATM) card, employee access card, and/or any other conventional magnetic-stripe type card. To prevent the card from being used by anyone other than its owner, a security test may be presented each time the user tries to transform the universal card. In one example, the described security test involves electronically comparing the user's fingerprint with the owner's fingerprint. A database may be generated containing the fingerprints of the owners.

In U.S. Pat. No. 6,782,998, entitled "Credit Card Holder", issued Aug. 31, 2004, there is described a protective case which partially surrounds one or more credit card sized articles for permitting the card to flex and when moving in and out of the protective holder. The holder has a bottom wall, four lateral walls and a plurality of protrusions that extend inwardly over the bottom wall to retain the card(s) in the holder. The bottom wall has an elliptical opening to permit the user to insert her/his finger to expand out the card(s) to shorten the effective length of same and thereby facilitate removal from the holder. The procedure may be reversed when inserting a card back in the holder. A scraper may be formed along a lower edge of one end wall to permit frost removal from the vehicle's windshield using the holder.

In U.S. Pat. No. 6,817,520, entitled "Magnetic Card Swipe Signature Security System", issued Nov. 16, 2004, there is described a method of verifying the identity of the user of a credit card comprising the steps of having the user pass the card's stripe through a card reader, measuring the timing of the card stripe passage, applying acceptance criteria to the measured timing, and verifying the identity if the acceptance criteria are met.

In U.S. Pat. No. 6,832,730, entitled "Smart Card With Rotating Storage", issued Dec. 21, 2004, there is described a credit sized card having a rotating magnetic memory. The card is provided with a laminated structure in which a stainless steel, plastic sandwich structure is employed. An opening in the plastic layer provides space for the rotating magnetic disk. Data is written to or read from the disk by positioning heads from an external system into openings in the external surface of the card. When the card is not engaged in a reader, a shutter covers the openings.

In U.S. Pat. No. 6,840,446, entitled "Apparatus And System For Optical Card Reading And Method Of Use", issued Jan. 11, 2005, there is described a method, system, and apparatus for reading from and writing to a multi-memory card, such as a bankcard, credit card, or "smart card". The apparatus of the system includes reading devices, writing devices, and controllers for reading from and writing to the magnetic, optical, and electronic memory portions of a multi-memory card.

As defined herein, and as mentioned above, the present invention provides a new and unique means for preventing card misuse as might occur should a card be lost or stolen. The defined invention is able to do so in a more expeditious manner than described in the above patents, can be produced in a relatively inexpensive manner using, for the most part, conventional components and known substrate processing methodologies, and is thus deemed to represent a significant advancement in the art.

OBJECTS AND SUMMARY OF THE INVENTION

It is, therefore, a primary object of the present invention to enhance the electronic card art.

It is another object of the invention to provide an electronic card with built-in means of protecting the card from misuse, It is another object of the invention to provide a card with such capabilities utilizing many known electronic components and manufacturing processes, thereby maintaining the cost of the resulting card product at a relatively inexpensive level.

According to one aspect of the invention, there is provided an electronic card assembly comprising a housing, a memory component positioned within the housing and adapted for storing first card information therein, an electronic card including an information portion and movably positioned within the housing for moving along a first path therein, and an information removing component positioned within the housing relative to the first path and adapted for removing second card information from the information portion of the electronic card as the card moves along the path in a first direction. The assembly further includes an information writing component positioned within the housing relative to the first path and adapted for writing the first card information into the information portion of the electronic card as the card moves along the path in a second direction, a human information read component positioned within the housing and adapted for reading human information from a human being, and an information processing component positioned within the housing and adapted for receiving the human information from the human information read component and comparing this human information to the first card information within the memory component. The information writing component is adapted for writing the first card information into the information portion of the electronic card if the information processing component favorably compares the human information to the memory's first card information.

BEST MODE FOR CARRYING OUT THE INVENTION

Figure 1:
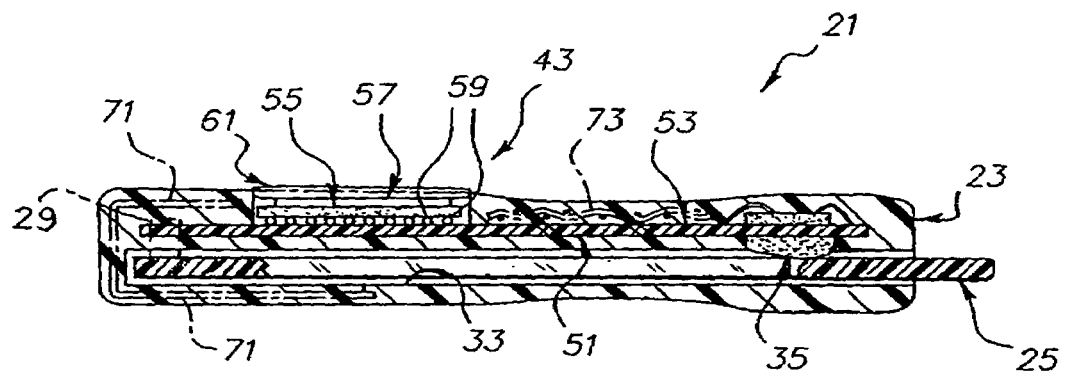
FIG. 1 is a side elevational view, taken in section, illustrating an electronic card assembly according to one embodiment of the invention, as taken along the line 1-1 in FIG. 2.

For a better understanding of the present invention, together with other and further objects, advantages and capabilities thereof, reference is made to the following disclosure and appended claims in connection with the above-described drawings. Like figure numbers will be used from FIG. to FIG. to identify like elements in these drawings.

By the term "circuitized substrate" as used herein is meant to include substrates having at least one (and preferably more) dielectric layer and at least one (and preferably more) metallurgical conductive layer. Examples include structures made of dielectric materials such as fiberglass-reinforced epoxy resins (some referred to as "FR-4" dielectric materials in the art), polytetrafluoroethylene (Teflon), polyimides, polyamides, cyanate resins, polyphenylene ether resins, photoimageable materials, and other like materials wherein the conductive layers are each a metal layer (e.g., power, signal and/or ground) comprised of suitable metallurgical materials such as copper (preferably electrodeposited copper foil as defined herein-above), but in the broader aspects may also include additional metals (e.g., nickel, aluminum, etc.) or alloys thereof. Further examples will be described in greater detail herein-below. If the dielectric materials for the structure are of a photoimageable material, it is photoimaged or photopatterned, and developed to reveal the desired circuit pattern, including the desired opening(s) as defined herein, if required. The dielectric material may be curtain-coated or screen-applied, or it may be supplied as dry film. Final cure of the photoimageable material provides a toughened base of dielectric on which the desired electrical circuitry is formed. An example of a specific photoimageable dielectric composition includes a solids content of from about 86.5 to about 89%, such solids comprising: about 27.44% PKHC, a phenoxy resin; 41.16% of Epirez 5183, a tetrabromobisphenol A; 22.88% of Epirez SU-8, an octafunctional epoxy bisphenol A formaldehyde novolac resin; 4.85% UVE 1014 photoinitiator; 0.07% ethylviolet dye; 0.03% FC 430, a fluorinated polyether nonionic surfactant from 3M Company; 3.85% Aerosil 380, an amorphous silicon dioxide from Degussa to provide the solid content. A solvent is present from about 11 to about 13.5% of the total photoimageable dielectric composition. The dielectric layers taught herein may be typically about 2 mils to about 4 mils thick, but also thicker if desired. Examples of circuitized substrates include printed circuit boards (or cards), hereinafter referred to also as PCBs, and chip carriers. It is believed that the teachings of the instant invention are also applicable to what are known as "flex" circuits (which use dielectric materials such as polyimide).

By the term "electronic card" as used herein is meant a card-like structure capable of being carried by persons and including some form of information as part thereof, and which is capable of storing such information as well as allowing such information to be removed (e.g., erased) by exterior means. Such a card is preferably of the same size and type as most existing credit or debit cards, or conventional bankcards, but may be slightly larger or even smaller.

Figure 2:
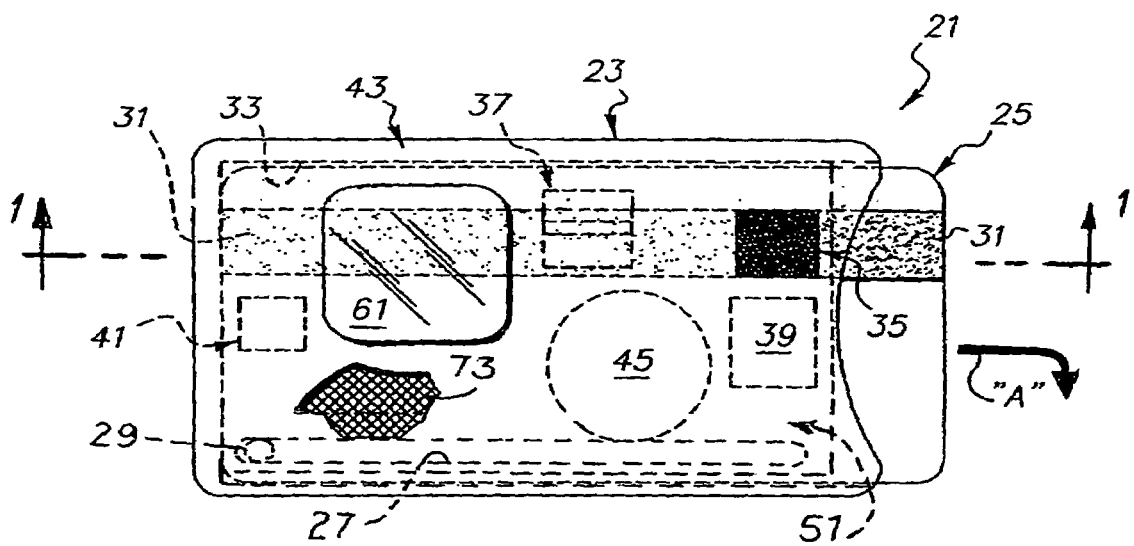
FIG. 2 is a plan view of the electronic card assembly of FIG. 1, showing many of the internal components thereof hidden.
Figure 3:
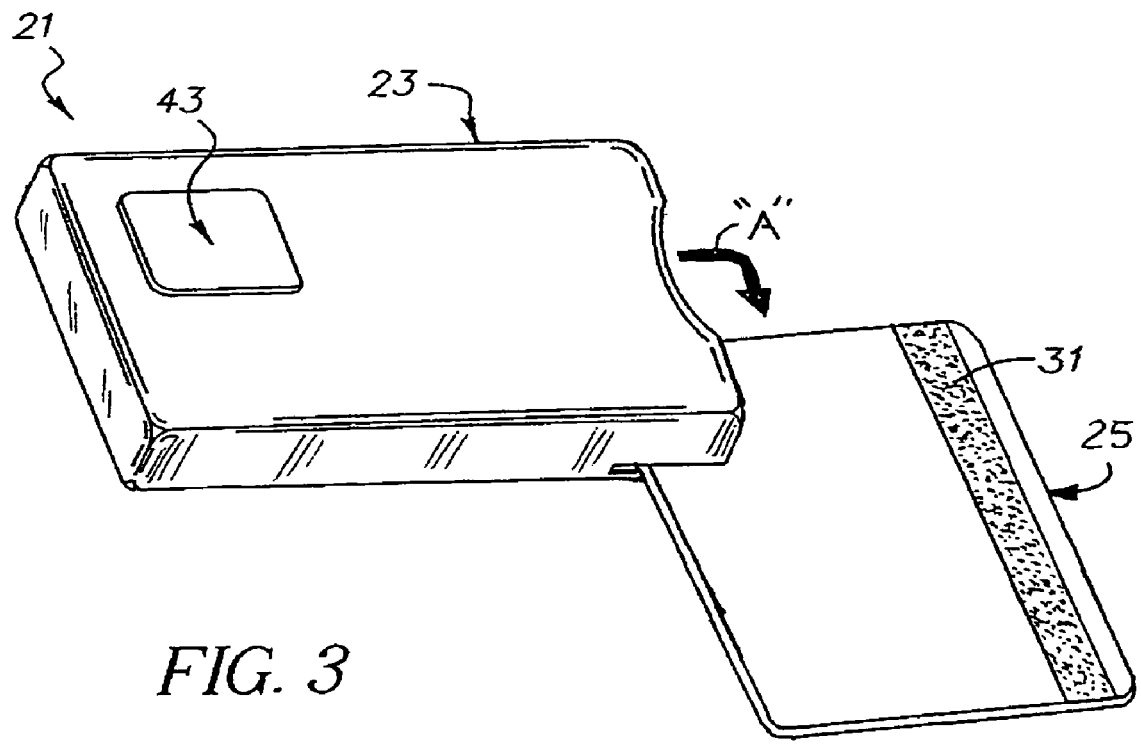
FIGS. 3 and 4 are perspective views illustrating the electronic card assembly according to one aspect of the invention, showing the relative movement of the electronic card relative to the assembly's housing.
Figure 4:
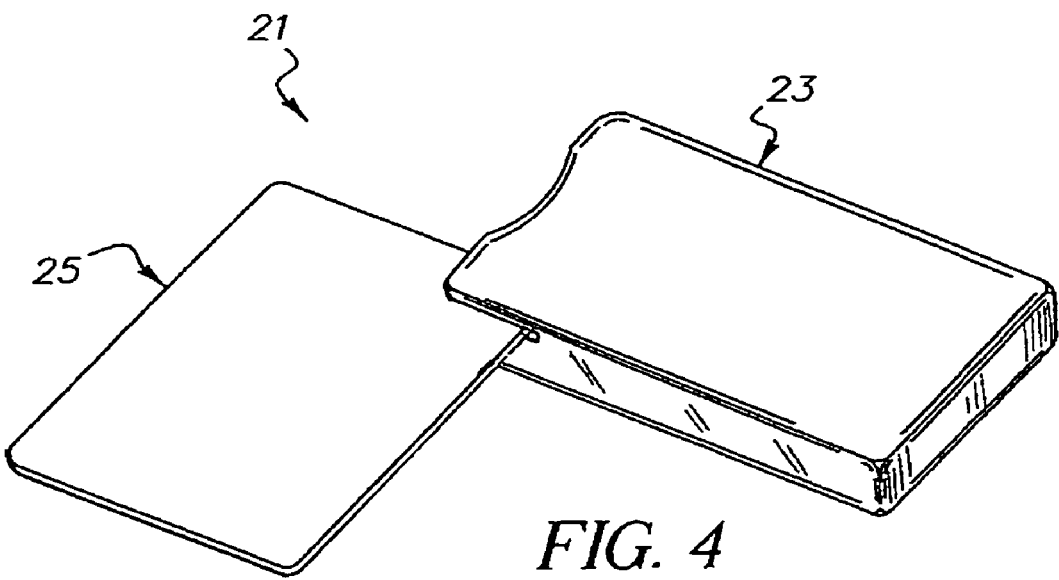

In FIGS. 1 and 2, there is shown an electronic card assembly 21 according to one aspect of the invention, the view in FIG. 1 being a side elevational view while the view in FIG. 2 is a plan, overhead view. For ease of explanation, reference will be made to both FIGS. simultaneously, except as noted. Electronic card assembly 21 includes a housing 23, preferably of a suitable plastic material such as ABS, an easily machined, tough, low cost rigid thermoplastic material with high impact strength. Another plastic material usable for housing 23 is the well known polycarbonate, Lexan, a high impact strength and flame retardant thermoplastic ideally suited for security applications. (Lexan is a registered trademark of General Electric.) This housing, as shown, is preferably of the rectangular, "boxlike" configuration illustrated so as to present a rectangular shape when viewed from the top or bottom, as in FIG. 2. In one embodiment, housing 23 is designed for holding the invention's electronic card 25 (preferably a card with a magnetic stripe as described in greater detail below) therein in a retained manner. That is, card 25 is permanently held within the housing in the embodiment shown in the drawings in a movable manner such that it can move along a first, substantially linear path ("A" in FIGS. 2 and 3) until it reaches a specified location, whereupon it is capable of being pivoted, as shown in FIGS. 3 and 4. To accomplish this, the card in FIGS. 1 and 2 includes a pin 29 as part thereof (either molded with the card or secured thereto later) which is designed for moving within an elongated slot 27 formed within a printed circuit board 51 (more description below) located within housing 23. Pin 29 is located at the end portion of the card designed for being fully inserted within the housing, and "rides" in slot 27 of board 51 as the card is withdrawn, the slot terminating at the end of the card and thus preventing further card removal. Significantly, pin 29 assures card 25 will move along path "A" such that the magnetic stripe 31 thereof aligns in a predetermined manner with various components, defined in greater detail below. Card 25 is thus capable of linear movement in two directions (into and out of housing 23) along path "A" and rotational movement when it has reached a predetermined location of outwardmost extension, the latter best shown in FIGS. 3 and 4. Card 25 cannot be completely removed from housing 23 in this embodiment, but remains secured thereto, albeit in the movable manner defined herein. Housing 23 includes an elongated channel 33 therein to accommodate card 25. (Card 25 is shown only partially in cross-section in FIG. 1, for illustration purposes.) Full card withdrawal to the extent shown in FIGS. 3 and 4 allows the user to use the card for its intended purpose, e.g., pass the magnetic stripe through a reader such as provided at many retail stores and banking institutions, to initiate and allow a transaction to occur. Card 25 cannot be so used when fully positioned within housing 23, as is understood, because the magnetic stripe is fully hidden within the protective housing.

Assembly 21, as explained further, enables the card user to initially insert the card 25 into channel 33 and thereby pass by designated components such that the information contained within the card's information portion (here, magnetic stripe 31) will be deleted (erased) from the card. The card is not able to be used until information is re-written back onto this information portion. The only way that such re-writing will occur is when the assembly is satisfied that the correct user is using the assembly. Thus, the invention protects card misuse by an unauthorized user, and, as defined herein, is only capable of being used by a designated user who has provided appropriate information to the assembly.

To accomplish the above when using a card with magnetic striping, as is the preferred embodiment for card 25, assembly 21 includes a read/write head 35 of conventional technology, e.g., such as those used in some known cassette players. In one embodiment, head 35 functions to both read information from the card's stripe 31 and provide this to the assembly's memory 37. In the simplest form of the invention, the information needs only be erased during card insertion, in which case head 35 would provide only such erasure and thus be of alternative construction than a conventional read/write head. Various erase components capable of accomplishing this function are known in the art and further description not considered necessary. If simple erasure occurs, the memory component will have necessary card information already programmed therein, as might occur by a separate input component (not shown). In a preferred embodiment, component 35 is a read/write head capable of both reading information from stripe 31 and subsequently writing information back onto the stripe as the card is withdrawn along path "A." If of this type, housing 23 will also include a magnetic head controller 39 operatively coupled to the head and designed for activating same upon receipt of signals from the invention's information processing unit (described below).

Although card 25 is described as restrained within housing 23, it is within the scope of the invention to allow the card to be fully removed, such that housing 23 can be used to accommodate a number of cards. In such a case, each card will have its information erased during entry and re-written upon withdrawal. The information to be re-written will be stored in the memory component and will be re-written according to some other criteria with respect to the card in question, e.g., indicia on the card's surface or even the magnetic stripe itself, such that only appropriate information will be re-written to each card inserted and withdrawn.

As stated, however, it is preferred to use housing 23 for a single card, with storage of the card's incoming (first information) being the same as that (second information) being re-written back into the card's information portion. Thus, the incoming information is read, provided to the card assembly's memory component (through the assembly's information processing component, described below), and then erased as the card reaches full insertion.

Memory component 37 is preferably a non-volatile random access memory (NVRAM) type device or similar. As stated, it holds the card's information such as card number, expiration date, card owner identification, and bank information, and operates in combination with the information processing component to receive and provide information. Convention memory components of this type are known in the art, with further description deemed unnecessary. Memory component 37 is shown adjacent the path taken by stripe 31, but this is not required.

Assembly 21 further includes the aforementioned information processing component, represented by the numeral 41. In a preferred embodiment, this component 41 is a conventional central processing unit, or CPU, and is the "brains" of assembly 21. It functions in combination with the memory component and human information read component 43, a preferred example of the latter being a fingerprint reader adapted for reading the fingerprints of the card user and provide such information to the CPU for comparison with the memory's information. Should the comparison be favorable (the human information is associated correctly with the card information), the CPU then inputs to the write component to write back onto the magnetic stripe the appropriate card information, such that the user can now use her/his card as intended. Should no favorable match occur, the card is not re-written, and cannot be utilized.

Power for assembly 21 to operate the functional components defined here is provided by a battery 45, several of which are known in the art and further description not considered essential. A suitable cover (not shown) is provided which, when opened, will permit replacement of the battery.

Electrical coupling between the various components of assembly 21 is preferably made possible using the conventional circuitry of a first circuitized substrate, the aforementioned printed circuit board (PCB) 51, located internally within housing 23 and protected by the outer walls thereof. Each of the components is electrically coupled to others as needed using the PCB's circuitry, with some of these (i.e., human information read component 43) being positioned on the PCB to assure a compact design for the invention. The exact layout of the circuitry is not shown herein but is readily understood to one of skill in the art, when understanding the operation and cooperation of the invention's components, as explained. In the embodiment of FIGS. 1 and 2, it is preferred that this circuitry be located on the upper surface 53 (FIG. 1). Significantly, the board 51 further includes the mentioned slot 27 therein, and thus also serves as an instrumental part in positioning card 25 for the invention.

In a preferred embodiment, human information read component 43 is, as stated a fingerprint reader of conventional technology. It is understood that other types of human information, e.g., cornea patterns, can be read and the invention is not limited to that shown and described herein. The reader is shown in FIG. 1 to include a second circuitized substrate 55 having at least one semiconductor chip 57 positioned thereon and electrically coupled to the second substrate's circuitry. The substrate 55 and chip 57 combination may also be defined as a "chip carrier", several of which are produced and sold by the assignee of the invention. This "carrier" is positioned on the first substrate 51 and coupled to the circuitry thereof using solder balls 59. The function of component 43 is to read a person's fingerprint and generate a data stream to the CPU for processing and eventual comparison to the stored memory information, as described above. To protect the "carrier", and especially its chip component, located over the "carrier" is a lens 61 (the "carrier" not being shown in FIG. 2). Preferably, lens 61 is made of polycarbonate or the like plastic material, several types of which are known, and is scratch resistant and can be easily cleaned when needed. Lens 61 also functions as a switch which, when depressed by the person's finger, will activate the read component 43 to take a reading. This switch, not shown, is preferably a simple mechanical switch located beneath the lens which can be triggered upon downward movement of the lens to form a desired electrical connection between two contacts. This switch, like the other electrically functional components of the invention, is preferably coupled to the circuitry on first substrate (PCB) 51. A spring or the like member may be used to return the lens to its original position.

Housing 23 may also include a shield 71 (only partly shown, in phantom) in the form of a thin metal sheet which is embedded within the housing and which surrounds the functioning components to prevent electromagnetic interference (EMI) with said components during operation. Shield 71 is preferably aluminum or other known shielding material. Although only shown to the left in FIG. 1, it is understood that this shield extends across the width of the housing and along the sides, as needed.

Housing 23 also preferably includes include tamper resistant structure, preferably in the form of a shield of wire, metal mesh 73 (also, only partly shown in FIG. 1). Mesh 73, also seen partially in FIG. 2, is coupled to the invention's CPU and is monitored by the CPU for possible intrusion of housing 23. Should the mesh be broken or significantly disfigured, the CPU will automatically shut down, and assembly 21 will be inoperable. It is within the scope of the invention that shield 71 and mesh 73 be a single structure and function in both capacities. Such dual operation is preferred to assure the small, compact design desired for the invention. As an alternative embodiment, it is also possible to use a flexible carrier-substrate such as a flex circuit, or, simply, a flexible carrier in which conductive ink is used for the circuit and/or mesh. In one example of how this security mesh operates, CPU 41 monitors the resistance of the mesh 73 in a continuous manner. When the resistance is increased due to an intrusion of housing 23 and, as a result, mesh 73 is broken or significantly disfigured, CPU 41 will output a "self-destruct" command to the flash memory 37. The result of this operation is the erasure of the memory 37 or the information stored in memory 37 is rendered useless to the intruder.

FIG. 3 illustrates how card 25 is fully extended from housing 23, when viewed from the top of the invention. It is seen that magnetic stripe 31 is fully exposed, sufficiently to allow it to pass through a designated reader. From the foregoing description, it is understood that card 25 pivots about the retained pin 29 held in the end of slot 27 nearest the exit portion of housing 23. FIG. 4, on a slightly smaller scale than FIG. 3, shows this pivotal orientation when taken from the bottom of the housing, it being understood that the magnetic stripe 31 is on the underside of the card in this view.

There has thus been shown and described an electronic card assembly which provides essential protection for the card component which is part thereof so as to prevent use of said card by someone not authorized to do so. This is achieved by an assembly which is of relatively simple construction, using many convention parts, with relatively minor modification thereto. The assembly is adapted for being used with a variety of cards, including those currently known in the art.

While there have been shown and described what are at present the preferred embodiments of the invention, it will be obvious to those skilled in the art that various changes and modifications may be made therein without departing from the scope of the invention as defined by the appended claims.

What is claimed is:

1. An electronic card assembly comprising:
   a housing;
   a memory component positioned within said housing and adapted for storing first card information therein;
   an electronic card including an information portion and movably positioned within said housing and adapted for moving along a first path within said housing;
   an information removing component positioned within said housing relative to said first path and adapted for removing second card information from said information portion of said electronic card as said card moves along said first path in a first direction;
   an information writing component positioned within said housing relative to said first path and adapted for automatically writing said first card information into said information portion of said electronic card as said electronic card moves along said first path in the opposite direction;
   a fingerprint reader positioned within said housing and adapted for reading human information from a human being; and
   an information processing component positioned within said housing and adapted for receiving said human information from said human information read component and comparing said human information to said first card information within said memory component, said information writing component adapted for writing said first card information into said information portion of said electronic card if said information processing component favorably compares said human information to said first card information within said memory component.

2. The electronic card assembly of claim 1 wherein said information portion of said electronic card comprises a magnetic stripe.

3. The electronic card assembly of claim 1 wherein said first card information and said second card information are the same.

4. The electronic card assembly of claim 3 further including an information reading component positioned within said housing and adapted for reading said second card information from said information portion of said electronic card as said electronic card moves along said first path in said first direction and for providing said second card information to said memory component, said information processing component thereby adapted for comparing said second card information within said memory component to said fingerprint reader.

5. The electronic card assembly of claim 1 wherein said memory component comprises a random access memory component.

6. The electronic card assembly of claim 1 wherein said information processing component comprises a central processing unit.

7. The electronic card assembly of claim 1 further including a first circuitized substrate positioned substantially within said housing, said information removing component, said information writing component, said fingerprint reader read component and said information processing component being electrically coupled to or forming part of the circuitry of said first circuitized substrate.

8. The electronic card assembly of claim 7 wherein said first circuitized substrate comprises a printed circuit board.

9. The electronic card assembly of claim 8 wherein said human information read component comprises an electronic package including a second circuitized substrate and at least one semiconductor chip, said second circuitized substrate of said electronic package being positioned on and electrically coupled to said printed circuit board.

10. The electronic card assembly of claim 1 further including a power source positioned substantially within said housing for providing power to said information removing component, said information writing component, said fingerprint reader and said information processing component.

11. The electronic card assembly of claim 1 further including an electronic card retention member for retaining said electronic card within said housing during said movement of said electronic card along said first path in both said first and opposite directions.

12. The electronic card assembly of claim 11 wherein said electronic card includes an elongated slot therein and said electronic card retention member comprises a pin, said pin adapted for moving within said elongated slot during said movement of said electronic card along said first path in both said first and opposite directions.

13. The electronic card assembly of claim 1 further including shielding structure within and/or on said housing for providing tamper protection against unauthorized access to said electronic card within said housing.

14. The electronic card assembly of claim 13 wherein said shielding structure comprises an electrically conductive mesh substantially encased within said housing and electrically coupled to said information processing component positioned within said housing, said information processing component adapted for sensing the electrical resistance of said electrically conductive mesh and, if said electrical resistance reaches a predetermined level, providing input to said memory component, said memory component erasing said first card information stored therein upon the receipt of said input from said information processing component.

15. The electronic card assembly of claim 1 further including electro-magnetic interference shielding structure within or on said housing for shielding said information processing component from electro-magnetic waves.

* * * * *